Figure 1:
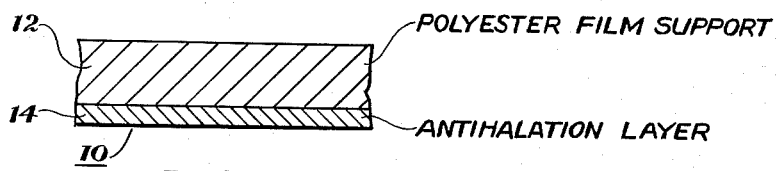

Aug. 17, 1965  G. W. PIERCE ETAL  3,201,249
COMPOSITE FILM ELEMENT AND COMPOSITION THEREFOR
INCLUDING ANTI-HALATION MATERIAL
Filed Aug. 25, 1961

George W. Pierce
Gale F. Nadeau
Crayton B. Thompson
INVENTORS

BY
ATTORNEYS

United States Patent Office 3,201,249
Patented Aug. 17, 1965

3,201,249
COMPOSITE FILM ELEMENT AND COMPOSITION THEREFOR INCLUDING ANTI-HALATION MATERIAL
George W. Pierce, Gale F. Nadeau, and Crayton B. Thompson, Rochester, N.Y., assignors to Eastman Kodak Company, Rochester, N.Y., a corporation of New Jersey
Filed Aug. 25, 1961, Ser. No. 133,959
9 Claims. (Cl. 96—84)

This invention relates to the photographic art and particularly to photographic film. More particularly, this invention relates to novel composite film elements comprised of a film support and an antihalation layer, which antihalation layer is comprised of a novel composition of matter.

The problem of halation is well known in the photographic art, and various means for overcoming it have been devised. Halation occurs in a photographic film when a light-sensitive film is exposed to a well-lighted subject and the surface of the film support does not contain a light-absorbing material. Light rays are reflected onto the sensitive material from the support and produce a spreading of the image which is known as halation. This undesirable effect can be overcome by placing a light-absorbing material on one of the surfaces of the film support, usually the rear surface, so that the light rays which would otherwise be reflected onto the sensitive layer are thereby absorbed. The other surface of the film support will carry a light-sensitive silver halide emulsion layer.

Film supports prepared from polyester resins such, for example, as polyethylene terephthalate have proved highly satisfactory in the manufacture of photographic film products. The use of polyester film supports has been limited to some extent however, owing to the fact that it has heretofore been difficult to establish and maintain a satisfactory bond between a surface of the polyester film support and an applied antihalation layer.

An object of this invention is to provide a composite film element for use in preparing film products comprising a polyester film support and a specific and novel antihalation layer, which antihalation layer is highly adherent and firmly bonded to the surface of the polyester film support, but can easily and readily be removed in alkaline photographic processing solutions.

A further object of this invention is to provide photographic film products comprising the composite film element of this invention.

Another object of this invention is to provide a novel composition of matter adapted for use as an antihalation layer for a polyester film support.

Other objects of this invention will, in part, be obvious and will, in part, appear hereinafter.

Figure 2:
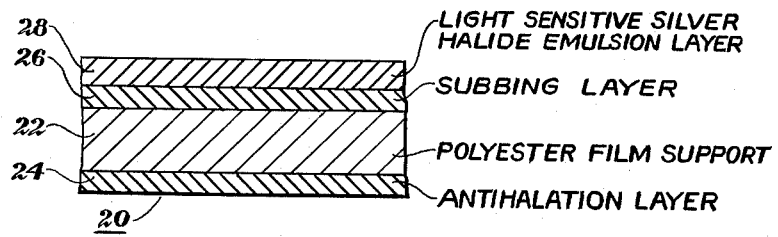

For a complete understanding of the nature and the objects of this invention reference is made to the following detailed description and drawing, in which:

FIG. 1 is a view in cross-section of a composite film element of this invention; and FIG. 2 is a view in cross-section of a film product comprising the composite film element of this invention.

In accordance with this invention, there is provided a composite film element comprised of (1) a polyester film support and (2) a specific and novel antihalation layer applied to at least one surface of the polyester film support. The novel composite film element of this invention can be employed to prepare photographic film products in a known manner such, for example, as by the method disclosed and described in application Serial No. 15,542, filed March 17, 1960 now U.S. Patent 3,143,421.

Further, in accordance with this invention, there is provided a novel composition of matter for use in preparing the composite film elements of this invention which is comprised of (a) a water-insoluble, alkali-soluble resinous vehicle or carrier, (b) an antihalation compound, and (c) a specific adhesion promoter. This composition is applied as a coating to at least one surface of a polyester film support, preferably in the form of a water solution or water dispersion thereof in a known manner. The applied coating or layer is suitably dried whereby there is provided a composite film element comprising the polyester film support and a highly adherent alkali-soluble layer having highly satisfactory antihalation properties.

The polyester film supports useful for carrying out this invention are well known in the photographic art and can be any of the polyester compositions disclosed in Patent 2,943,937, or the polyester composition can be that disclosed in Patent 2,627,088 or in Patent 2,779,684. In carrying out this invention it is preferred that the polyester film support be biaxially stretched prior to the application of the antihalation coating composition of this invention.

A specific example of a polyester film support that has proved highly satisfactory for use in preparing photographic film products is that prepared from an ethylene glycol-terephthalic acid polyester having a melting point above about 200° C. Polyesters of this type and their method of preparation are described in Patent 2,465,319. Thus, the desired amounts of ethylene glycol and terephthalic acid are placed in a suitable reaction vessel and the polymerization is carried out under a vacuum of about 0.5 mm., and at a temperature of from about 215° C. to 285° C. A molten polymer is prepared and is cast into a film of desired thickness usually of the order of from about 3 mils to 7 mils.

The water-insoluble, alkali-soluble resinous vehicle or carrier (a) employed in preparing the novel composition of this invention can be any of those employed heretofore in antihalation layers or backings. The alkali solubility of the resin is a preferred property so that it will easily and readily dissolve in conventional alkaline photographic developing solutions. Thus, the applied antihalation layer will be removed from the film support when an exposed film product prepared from the composite film element of this invention is subjected to conventional developing processes.

Examples of suitable water-insoluble, alkali-soluble resins for use in carrying out this invention include the copolymers of alkyl methacrylates and methacrylic acid, the carboxy resinic lactones, the polyvinyl phthalates, the polyvinyl acetate phthalates, and the ethyl cellulose phthalates. Other suitable resins include the cellulose organic acid esters containing dicarboxylic acid groups such as cellulose acetate phthalate, cellulose acetate maleate, cellulose acetate succinate, cellulose acetate propionate phthalate, cellulose acetate propionate maleate, and cellulose acetate propionate succinate. The above enumerated resins and their method of preparation are well known in the art.

The copolymers of alkyl methacrylates and methacrylic acid employed in this invention are preferably those comprised of from about 30 percent to 60 percent by weight of methacrylic acid and from about 70 percent to 40 percent by weight of an alkyl methacrylate such, for example, as methyl methacrylate, ethyl methacrylate, propyl methacrylate, isopropyl methacrylate, n-butyl methacrylate, t-butyl methacrylate. Mixtures of the alkyl methacrylates can be used to prepare the copolymer if desired.

The carboxy resinic lactones, often referred to as carboxy ester-lactone resins, that are suitable for use in this invention are those disclosed in Patent 2,861,056 and in application Serial No. 772,725, filed Nov. 10, 1958, now U.S. Patent 3,007,901. These esters are a carboxy ester of a monohydroxycarboxylic acid of the formula $$C_nH_{2n-x+1}(OH)(COOH)_x$$

wherein $n$ is an integere in the range of 1 to 5 inclusive and $x$ is an integer in the range of 1 to 2 inclusive and a lactone of an interpolymer of vinyl alcohol and an unsaturated α,β-dicarboxylic acid compound from the group consisting of maleic acid, fumaric acid, itaconic acid, and their anhydrides, the carboxy group of the carboxy ester being the carboxy group of said monohydroxycarboxylic acid. These esters can be prepared by heating to at least about 60° C., in the presence of a mineral acid such, for example, as sulfuric acid, about one molar proportion of an interpolymer of a vinyl organic acid ester and an unsaturated α,β-dicarboxylic acid compound from the group consisting of maleic acid, fumaric acid, itaconic acid, and their anhydrides, with at least two molar proportions of a monohydroxy acid of the formula above set forth, such, for example, as glycolic acid, lactic acid, hydroxybutyric acid, and malic acid. These esters can be modified further in accordance with the teachings of application Serial No. 772,725, filed Nov. 10, 1958, referred to above. Thus, for example a monohydric alcohol such as methanol, ethanol, propanol, butanol, or mixtures thereof can be incorporated into the reaction mixture before reaction whereby mixed carboxy ester-lactones are obtained.

Reference is hereby made to Patent 2,861,056 and application Serial No. 772,725, filed Nov. 10, 1958, for a detailed description of the carboxy ester-lactone resins and their method of preparation.

The cellulose organic acid esters containing dicarboxylic acid groups are well known. Such esters and their method of preparation are described in Patent 2,093,462.

Polyvinyl phthalate and polyvinyl acetate phthalate resins also are well known in the art. The resins and their method of manufacture are described in Patent 2,484,415 reference to which is hereby made. Thus, polyvinyl acetate phthalate can be prepared by reacting polyvinyl acetate having free and esterifiable hydroxyl groups with phthalic anhydride and pyridine, the pyridine being present in an amount less than sufficient to combine with all the carboxyl groups present after the esterification is completed. Polyvinyl phthalate is prepared in a similar manner except that polyvinyl alcohol is used as a reactant in place of the polyvinyl acetate.

The ethyl cellulose phthalates are also well-known resinous materials. The ethyl cellulose phthalates that are particularly useful in this invention have an ethoxyl content of from about 36% to 38% and a phthalyl content of from about 6% to 35%. The alkali or ammonium salts of these resins are soluble in water or in ethanol at a temperature of from about 50° to 70° F. These resins can be derived by the reaction of ethyl cellulose and phthalic anhydride by the method disclosed in Patent 2,753,339. Reference is hereby made to this patent.

The antihalation compound (b) employed in this invention is selected from any of the well-known antihalation dyes, antihalation pigments, and mixtures thereof. Examples of antihalation dyes or pigments that can be employed in this invention include such compounds as the silver salts of hydroxyazaindolizines, such as 6-[5,7-disulfonaphthalene-1-azo]-7-hydroxy-5-methyl-1,3,4-triazaindolizine, 5-[3,5-dicarboxy phenyl-1-azo]-4-hydroxy-6-methyl-2,3,7-triazaindolizine, and the like, disclosed in Patent 2,390,707; xanthylium dye salts, such as 3,9-dihydroxy-6-p-methoxystyrylxanthylium chloride, 3,9-dihydroxy-6-p-dimethylaminostyrylxanthylium chloride, and the like, disclosed in Patent 2,461,485; pyrylium dye salts, such as 4-(4'-dimethylaminostyryl)-7-hydroxy-2-phenylbenzopyrylium chloride, 2',4'-dihydroxy-2-styryl - benzopyrylium chloride, 4'-hydroxy-2-styrylbenzopyrylium chloride, and the like, as disclosed in Patent 2,461,484; the triphenylmethane derivatives disclosed in Patent 1,912,797, Patent 2,098,891, Patent 2,147,112, Patent 2,150,695, and Patent 2,282,890; the dyestuff combinations disclosed in Patent 1,923,485; the methine and polymethine dyes disclosed in Patent 2,268,798, Patent 2,298,731, and Patent 2,298,733; Prussian blue, titanium dioxide, manganese dioxide, carbon black and the like.

Other suitable antihalation dyes include bis-[1-(p-sulfophenyl)-3-methyl-5-(4)-pyrazolone] methinoxonol, and 4-[(3-ethyl-2(3)-benzoxazolylidene)butenylidine]-3-methyl-1-1-p-sulfophenyl-5-pyrazolone. Bis(3-methyl-p-sulfophenyl-5-pyrazolone) mono-methine oxonol, bis(3-methyl-p-sulfophenyl-5-pyrazolone trimethine oxonol, and bis(3 - methyl-p-sulfophenyl-5-pyrazolone)pentamethine oxonol can be employed also as antihalation dyes. Other oxonols suitable for use as antihalation dyes are disclosed in British Patents 506,385 and 515,998 to Gaspar. It is to be understood that mixtures of two or more dyes and pigments can be employed if desired.

The only prerequisites imposed upon the antihalation compounds are that they be readily dischargeable or dispersible in the usual photographic processing baths or optional alkaline prebaths which may be used for the removal of the antihalation layer prior to development. Further, the antihalation compounds employed should be compatible with the other components that comprise the antihalation layer.

An adhesion promoter (c) suitable for use in this invention has the structural formula

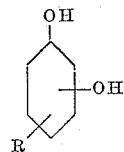

wherein R can be hydrogen; a lower alkyl radical of from about 1 to 6 carbon atoms, such as methyl, ethyl, propyl, n-butyl, and hexyl; a halogen such as chlorine, bromine or iodine; or a hydroxyl radical. Specific examples of such compounds include resorcinol, pyrocatechol, pyrogallol, hydroquinone, orcinol and chlororesorcinol.

Other suitable adhesion promoters that can be employed in carrying out this invention include trichloroacetic acid, ethylene carbonate, chloral hydrate, also known as 2,2,2-trichloro-1-,1-ethanediol, chloro thymol, and o-cresol.

The amount of adhesion promoter (c) employed can be varied over a relatively wide range. It has been determined, however, that from about 0.5 part by weight to about 5 parts by weight of adhesion promoter based on one part by weight of the water-insoluble, alkali-soluble resin (a), produces satisfactory results.

The amount of antihalation compound (b) employed will vary over a relatively wide range depending on the tinctorial properties of the dye employed. The proper amount to employ is well within the skill of those versed in the art.

As previously set forth, it is preferred to apply the antihalation layer of this invention to the surface of a polyester film support as a water solution or water dispersion thereof, depending, of course, upon the water solubility of the components employed in the composition. Owing to the fact that the resins employed are substantially water-insoluble, it is preferred to render them water-soluble by admixing therewith a small amount of ammonia whereby there is provided the ammonium salt of the resin which is water-soluble. The amount of ammonia (28 percent water solution) employed will be from about 0.2 part to 1 part by weight based on one part by weight of the resin. After application of the coating composition to a surface of a polyester film support, the composite member is subjected to heat whereby water is removed, ammonia is driven off from the applied coating and the water-insolubility property of the resin component is reestablished.

Suitable known spreading agents can be added to the aqueous solution or dispersion of the composition of this invention to provide for more satisfactory application thereof to the surface of the polyester film support. Suitable spreading agents are well known and include saponin, polyglycerol monolaurate, and the sodium salts of alkyl aryl sulfonates. The amount of spreading agent employed can be varied over a wide range and it is well within the skill of those versed in the art to incorporate into the composition the desired amount. Usually, the amount employed will vary from about 0.02 part by weight to 0.20 part by weight based upon one part by weight of the resin employed in preparing the composition.

The following examples are illustrative of suitable aqueous coating compositions for use in carrying out this invention. The ingredients are thoroughly admixed prior to application. Application can be made to a surface of a polyester film support in any conventional manner such as by roll coating.

EXAMPLE I

| Ingredient: | Percent by weight |
|---|---|
| Resorcinol | 5.0 |
| Butyl methacrylate-methacrylic acid copolymer, molar ratio of 1:1 | 3.0 |
| Ammonium hydroxide (28% $NH_3$) | 1.0 |
| Antihalation dye, 4-1(3-ethyl-2(3)- benzoxazolylidene) ethylidene-3-methyl-1-1(p-sulfophenyl)-5-pyrazolone | 0.25 |
| Antihalation dye, sulfonated fuchsin | 0.25 |
| Saponin | 0.10 |
| Glycerin | 0.25 |
| Antihalation dye, sodium salt of dibenzeldiethyldiamine-triphenylcarboniol | 0.35 |
| Distilled water | balance to 100 |

EXAMPLE II

| Ingredient: | Percent by weight |
|---|---|
| Resorcinol | 5.0 |
| 60% butyl methacrylate-40% methacrylic acid copolymer | 3.0 |
| Ammonium hydroxide (28% $NH_3$) | 1.0 |
| Saponin | 0.10 |
| Aquablak H (a 30% aqueous dispersion of finely divided carbon) | 1.25 |
| Distilled water | balance to 100 |

The aqueous coating composition of Example I is applied by roller application directly to a biaxially oriented crystalline polyethylene terephthalate film support and subsequently dried in an oven maintained at a temperature of from about 60° C. to 120° C., whereby ammonia is driven off and there is provided a substantially clear, moisture-resistant coating or layer. The resulting antihalation layer is well bonded and firmly adherent to the surface of the polyethylene terephthalate film support. This layer can be easily and readily removed in conventional alkaline developing baths.

The aqueous coating composition of Example II is applied to a surface of a biaxially oriented crystalline polyethylene terephthalate film support in the same manner as that described in Example I to provide a composite film element comprised of the polyethylene terephthalate film support and an antihalation layer which layer is well bonded and firmly adherent to the surface of the polyethylene terephthalate film, and is capable of withstanding the abuse to which it is subjected during use.

The antihalation layers of Example I and Example II are readily soluble in common alkaline photographic developers leaving the surface of the basically inert polyethylene terephthalate free of any foreign material. Thus, developed film products can be stacked one upon another or convolutely wound on a reel without the danger of the developed photographic emulsion adhering or sticking to the film support.

A gelatinous silver halide emulsion layer can be applied to the composite film element of this invention to provide a highly satisfactory photographic film product. A highly satisfactory method for this purpose is disclosed in application Serial No. 15,542, filed Mar. 17, 1960. Thus, for example, the uncoated surface of the composite film element of this invention can be coated with a coating composition comprising a copolymer of methyl acrylate, vinylidene chloride, and itaconic acid and from about 0.1 percent to 5 percent by weight of resorcinol. A gelatin layer is then applied over the thus-applied coating composition and subsequently, there is applied the gelatinous silver halide light-sensitive emulsion layer thereto to provide a photographic film comprised of the composite film element.

Further, the antihalation layer of this invention can be conveniently applied to the photographic film products disclosed and described in application Serial No. 15,542, filed Mar. 17, 1960, if desired to provide satisfactory photographic film products.

In FIG. 1 of the drawing there is shown a composite film element 10 of this invention which is comprised of a polyester film support 12 and an antihalation layer 14 comprised of a water-insoluble, alkali-soluble resinous vehicle, an antihalation dye or pigment or mixtures of two or more antihalation dyes, and an adhesion promoter.

FIG. 2 of the drawing shows a photographic film product 20 comprised of the composite film element of this invention. The film product 20 is comprised of a polyester film support 22, an antihalation layer 24 comprised of the novel composition of the invention, a subbing layer 26, and a light sensitive silver halide emulsion layer 28. It is to be understood that other subbing layers in addition to the single subbing layer 26 can be employed if desired or required to provide a satisfactory film product. Suitable subbing layers for this purpose are disclosed and described in the above referred to application Serial No. 15,542, filed Mar. 17, 1960.

It is to be understood that the above description, drawing, and examples are illustrative of this invention and not in limitation thereof.

We claim:

1. A composition of matter comprising (a) a water-insoluble, alkali-soluble resin, (b) a compound selected from the group consisting of antihalation dyes and antihalation pigments and (c) a compound selected from the group consisting of resorcinol, pyrocatechol, pyrogallol, hydroquinone, orcinol, chloro-resorcinol, trichloroacetic acid, ethylene carbonate, chloral hydrate, chloro thymol, and o-cresol.

2. A composition of matter comprising (a) a water-insoluble, alkali-soluble resin selected from the group consisting of copolymers of alkyl methacrylates and methacrylic acid, carboxy resinic-lactones, polyvinyl phthalates, polyvinyl acetate phthalates, ethyl cellulose phthalates, and cellulose organic acid esters containing dicarboxylic acid groups, (b) a compound selected from the group consisting of antihalation dyes and antihalation pigments and (c) a compound selected from the group consisting of resorcinol, pyrocatechol, pyrogallol, hydroquinone, orcinol, chloro-resorcinol, trichloroacetic acid, ethylene carbonate, chloral hydrate, chloro thymol, and o-cresol.

3. A composition of matter comprising (a) a butyl methacrylate-methacrylic acid copolymer, (b) at least one antihalation dye and (c) resorcinol.

4. A composite film element comprising (1) a polyester film support and (2) a highly adherent and firmly bonded antihalation layer comprising (a) a water-insoluble, alkali-soluble resin, (b) a compound selected from the group consisting of antihalation dyes and antihalation pigments and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and o-cresol, said antihalation layer being readily soluble and removable in alkaline photographic processing solutions and being bonded directly to a surface of the polyester film support.

5. A composite film element comprising (1) a polyester film support and (2) a highly adherent and firmly bonded antihalation layer comprising (a) a water-insoluble, alkali-soluble resin selected from the group consisting of copolymers of alkyl methacrylates and methacrylic acid, carboxy resinic-lactones, polyvinyl phthalates, polyvinyl acetate phthalates, ethyl cellulose phthalates, and cellulose organic acid esters containing dicarboxylic acid groups, (b) a compound selected from the group consisting of antihalation dyes and antihalation pigments and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and o-cresol said antihalation layer being bonded directly to a surface of the polyester film support.

6. A composite film element comprising (1) a polyester film support and (2) a highly adherent and firmly bonded antihalation layer comprising (a) a butyl methacrylate-methacrylic acid copolymer, (b) at least one antihalation dye and (c) resorcinol, said antihalation layer being bonded directly to a surface of the polyester film support.

7. A photographic film product comprising (1) a polyester film support, (2) at least one antihalation layer comprising (a) a water-insoluble, alkali-soluble resin, (b) a compound selected from the group consisting of antihalation dyes and antihalation pigments and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and o-cresol, said antihalation layer being firmly bonded to a surface of the polyester film support and (3) a light-sensitive silver halide emulsion layer said antihalation layer being bonded directly to a surface of the polyester film support and disposed on a side of the support opposite the light-sensitive layer.

8. A photographic film product comprising (1) a polyester film support, (2) at least one antihalation layer comprising (a) a water-insoluble, alkali-soluble resin selected from the group consisting of copolymers of alkyl methacrylates and methacrylic acid, carboxy resinic-lactones, polyvinyl phthalates, polyvinyl acetate phthalates, ethyl cellulose phthalates, and cellulose organic acid esters containing dicarboxylic acid groups, (b) a compound selected from the group consisting of antihalation dyes and antihalation pigments and (c) a compound selected from the group consisting of resorcinol, pyrocatechol, pyrogallol, hydroquinone, orcinol, chlororesorcinol, trichloroacetic acid, ethylene carbonate, chloral hydrate, chloro thymol, and o-cresol, said antihalation layer being firmly bonded to a surface of the polyester film support and (3) a light-sensitive silver halide emulsion layer said antihalation layer being bonded directly to a surface of the polyester film support and disposed on a side of the support opposite the light-sensitive layer.

9. A photographic film product comprising (1) a polyester film support, (2) at least one antihalation layer comprising (a) a butyl methacrylate-methacrylic acid copolymer, (b) at least one antihalation dye and (c) resorcinol, said antihalation layer being firmly bonded to a surface of the polyester film support and (3) a light-sensitive silver halide emulsion layer said antihalation layer being bonded directly to a surface of the polyester film support and disposed on a side of the support opposite the light-sensitive layer.

References Cited by the Examiner
UNITED STATES PATENTS

| | | | |
|---|---|---|---|
| 2,391,181 | 12/45 | Minsk | 96—87 X |
| 2,976,168 | 3/61 | Thompson et al. | 96—84 |

FOREIGN PATENTS 782,165   9/57   Great Britain.

NORMAN G. TORCHIN, *Primary Examiner.*

PHILIP E. MANGAN, *Examiner.*